United States Patent
Gibbs (10) Patent No.: US 10,451,247 B2
(45) Date of Patent: *Oct. 22, 2019

(54) OPTIC AND APPARATUS FOR MAKING AN OPTIC

(71) Applicant: Eaton Intelligent Power Limited, Dublin (IE)

(72) Inventor: Anthony Ryan Gibbs, Atlanta, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,765

(22) Filed: Aug. 6, 2018

(65) Prior Publication Data

US 2018/0347783 A1   Dec. 6, 2018

Related U.S. Application Data

(62) Division of application No. 14/702,477, filed on May 1, 2015, now Pat. No. 10,041,646.

(51) Int. Cl.
  *F21V 5/00* (2018.01)
  *F21V 5/04* (2006.01)
  (Continued)

(52) U.S. Cl.
  CPC .............. *F21V 5/007* (2013.01); *B29C 39/00* (2013.01); *B29C 45/2673* (2013.01);
  (Continued)

(58) Field of Classification Search
  CPC .......... F21V 5/002; F21V 5/005; F21V 5/007; F21V 5/046; B29C 39/00; B29C 45/2673; B29K 2069/00
  (Continued)

(56) References Cited

U.S. PATENT DOCUMENTS 1,495,521 A   5/1924   Kopp
7,703,950 B2 *   4/2010   Ewert ................. B29C 45/0025
                                                    362/311.02
(Continued)

FOREIGN PATENT DOCUMENTS

RU            70342    1/2008
WO   WO 2011/076214   6/2011

OTHER PUBLICATIONS

CXB Series. LED Low-Bay/High-Bay Luminaire CREE. www.cree.com/lighting.

(Continued)

*Primary Examiner* — Ali Alavi
(74) *Attorney, Agent, or Firm* — King & Spalding LLP (57) ABSTRACT

An optic can manage light emitted by a light emitting diode. The optic can comprise a backside that faces the light emitting diode and a front side opposite the backside. The front side can be convex. The backside can have a central region that is adjacent the light emitting diode and that is either concave or convex. One or more grooves can extend peripherally about the central region. An injection molding system can produce optics in which the backside comprises the concave central region as well as optics in which the backside comprises the convex central region. The molding system can utilize one molding member shaped according to the front side of the optic. That molding member can be compatible with two other molding members that are shaped according to the different backsides of the optic. Thus, two different optic forms can be produced with three molding members.

17 Claims, 9 Drawing Sheets

(51) Int. Cl.
  *F21V 5/02* (2006.01)
  *B29C 39/00* (2006.01)
  *B29C 45/26* (2006.01)
  *B29D 11/00* (2006.01)
  *G02B 19/00* (2006.01)
  *F21Y 115/10* (2016.01)
  *B29L 11/00* (2006.01)
  *B29L 31/00* (2006.01)
  *B29K 69/00* (2006.01)

(52) U.S. Cl.
  CPC ........ *B29D 11/00298* (2013.01); *F21V 5/005* (2013.01); *F21V 5/02* (2013.01); *F21V 5/046* (2013.01); *G02B 19/0014* (2013.01); *G02B 19/0028* (2013.01); *G02B 19/0061* (2013.01); *B29C 2045/2677* (2013.01); *B29K 2069/00* (2013.01); *B29L 2011/0016* (2013.01); *B29L 2011/0075* (2013.01); *B29L 2031/747* (2013.01); *F21V 5/045* (2013.01); *F21Y 2115/10* (2016.08)

(58) Field of Classification Search
  USPC .......................................................... 362/237
  See application file for complete search history.

(56) References Cited

U.S. PATENT DOCUMENTS

| | | | |
|---|---|---|---|
| 8,729,571 | B2 | 5/2014 | Daschner et al. |
| 10,041,646 | B2* | 8/2018 | Gibbs ............... B29C 39/00 |
| 2006/0139953 | A1 | 6/2006 | Chou |
| 2009/0213607 | A1 | 8/2009 | Tatsukawa |
| 2015/0043222 | A1* | 2/2015 | Jiang ............... F21V 5/04 362/327 |

OTHER PUBLICATIONS

Phuzion. LED High Bay. HOLOPHANE: Leader in Lighting Solutions. Acuity Brands. pp. 1-5. www.holophane.com.
Twin Arm Mount Accessory Kit for JHBL. LED Important Safety Instructions. Acuity Brands Lighting. Dec. 1, 2010.
Phuzion Highbay Luminaire. LED Important Safety Instructions. Acuity Brands Lighting. Dec. 1, 2011.
International Search Report for PCT Patent Application No. PCT/US2016/029831 dated Aug. 25, 2016.

\* cited by examiner

OPTIC AND APPARATUS FOR MAKING AN OPTIC

RELATED APPLICATIONS

The present application is a divisional application of and claims priority to U.S. patent application Ser. No. 14/702,477, filed May 1, 2015, and titled "Optic and Apparatus for Making an Optic," the entire content of which is incorporated herein by reference.

TECHNICAL FIELD

Embodiments of the technology relate generally to illumination, and more particularly to optics for managing light emitted by a light emitting diode ("LED") and to tooling for molding such optics.

BACKGROUND

Luminaires with different illumination patterns can be suited to different applications or different mounting configurations. If a luminaire were to be mounted close to a large area to be illuminated, a broad illumination pattern might be desired. And if the luminaire were to be mounted a greater distance from the same area, a narrower illumination pattern might be desired.

Accordingly, need is apparent for improved capabilities to outfit a luminaire with optics that provide different illumination patterns according to the application or the mounting configuration. Need exists for optics that have different or application-specific divergence characteristics and can be selected and incorporated in a luminaire readily and efficiently. Need further exists for a capability of making a family of such optics using cost effective tooling. A technology addressing one or more such needs, or some related deficiency in the art, could advance the illumination field.

SUMMARY

In one aspect of the disclosure, an optic can manage light emitted by a light emitting diode. The optic can comprise a backside that faces the light emitting diode and a front side opposite the backside. The front side can be convex. The backside can have a centrally located convex region and a plurality of grooves extending about the centrally located convex region.

In another aspect of the disclosure, another optic can manage light emitted by a light emitting diode. The optic can comprise a backside that faces the light emitting diode and a front side opposite the backside. The front side can be convex. The backside can have a centrally located concave region and at least one groove extending about the centrally located concave region.

In another aspect of the disclosure, a molding system can produce two or more types of optics that have common front-side contours but different backside contours. The system can comprise three molding members. A first molding member can be shaped according to the front-side contour. A second molding member can be shaped according to one backside contour. A third molding member can be shaped according to another backside contour. The first molding member can be combined with the second molding member for producing one type of optic and can further be combined with the third molding member for producing another type of optic.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

An optic can manage light emitted by a light emitting diode to provide a desired illumination pattern. Different types of the optic can provide different illumination patterns, for example to accommodate different mounting heights in outdoor applications with overhead mounting. The different optic types can incorporate a common front-side contour and different backside contours.

One example backside contour can comprise a convex region surrounded by one, two, three, or more grooves. Another example backside contour can comprise a convex region without any surrounding grooves. Another backside contour can comprise a concave region surrounded by one, two, three, or more grooves. Another example backside contour can comprise a concave region without any surrounding grooves.

A family of optics can comprise two, three, or more types of optics. The different types of optics may incorporate a common front-side profile. Utilizing a common front-side lens profile can reduce the number of tooling inserts utilized to manufacture the different optics, thereby saving capital cost as well as reducing complexity. For example, an injection mold that incorporates interchangeable molding parts or tooling inserts can produce the different types of the optics.

As discussed in further detail below, three different backside profiles can be incorporated in three different types of optics in order to achieve three desired performance distributions. The resulting optics can support a narrow distribution, for example a 60-degree beam, a medium distribution, for example an 85-degree beam, and a wide distribution, for example a 110-degree beam. The distributions can be selected for applications with different mounting heights, for example in a range of 15 to 50 or more feet. In some embodiments, the wide distribution can be deployed to illuminate a wide area at a lower mounting height, and the narrow distribution can be deployed to illuminate a similar area at a substantially higher mounting height.

Utilizing a neutral curvature for the outer, front-side profile and varying the curvature for the inner or backside profiles, can support three distinct functional distributions. Optical efficiency can be enhanced, for example five percent or more, by using an internal total internal reflectance ("TIR") wall for high-angle light that otherwise might not contribute significantly to a desired narrow or wide illumination distribution. Distribution can further be improved substantially for a narrow distribution, for example elevating intensity at giving at nadir. Both the narrow and wide distributions can utilize total internal reflectance walls to improve efficiency and beam distribution and to support color mixing for improved color uniformity of a beam, for example.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

The technology will now be described more fully with reference to FIGS. 1-15, which describe representative embodiments of the present disclosure. FIGS. 1-5 describe a first representative optic that has a first backside form, along with representative fabrication tooling. FIGS. 6-9 describe a second representative optic that has a second backside form, along with representative fabrication tooling. FIGS. 12-15 describe a third representative optic that has a second backside form, along with representative fabrication tooling.

Figure 1:
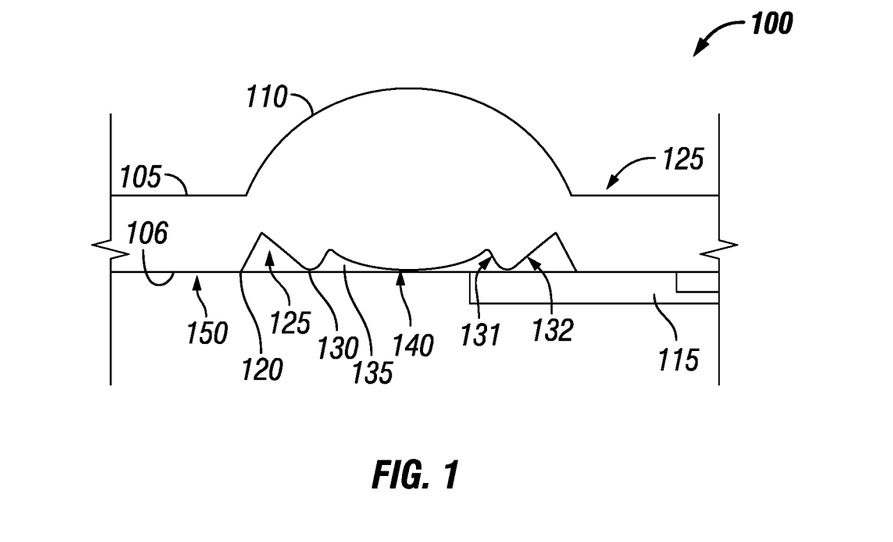
FIG. 1 illustrates a cross sectional view of an optic for managing light emitted by a light emitting diode according to some example embodiments of the present disclosure.
Figure 2A:
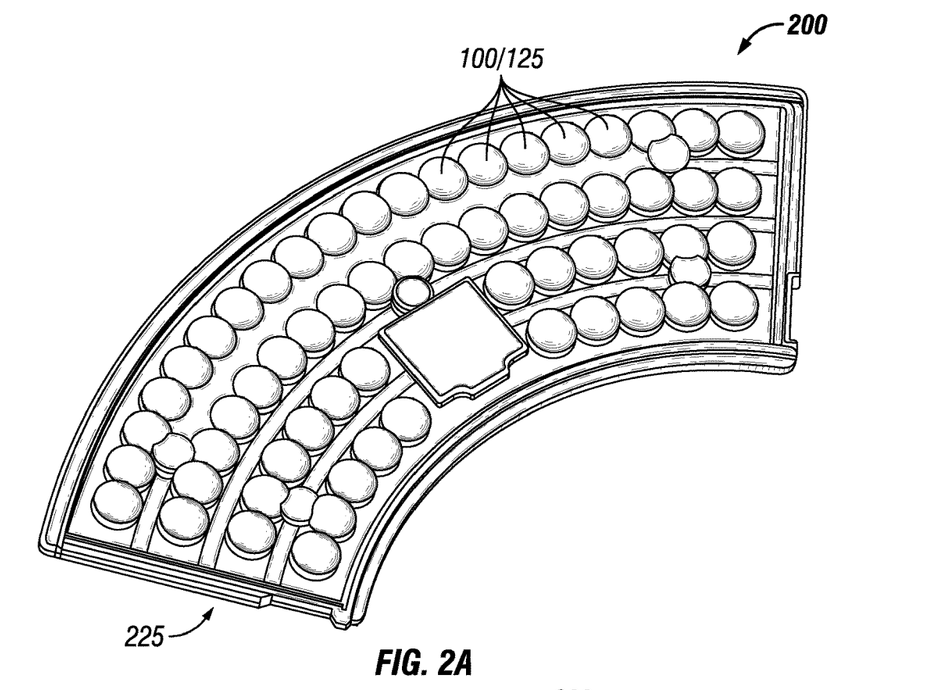
FIGS. 2A and 2B (collectively FIG. 2) illustrate front and backsides of an array of the optics illustrated in FIG. 1 according to some example embodiments of the present disclosure.
Figure 2B:
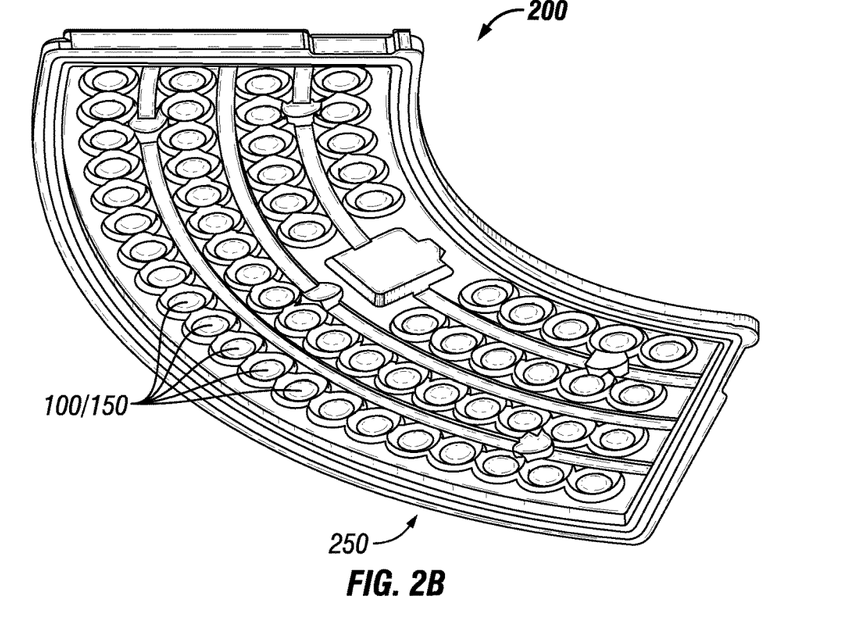
Figure 3:
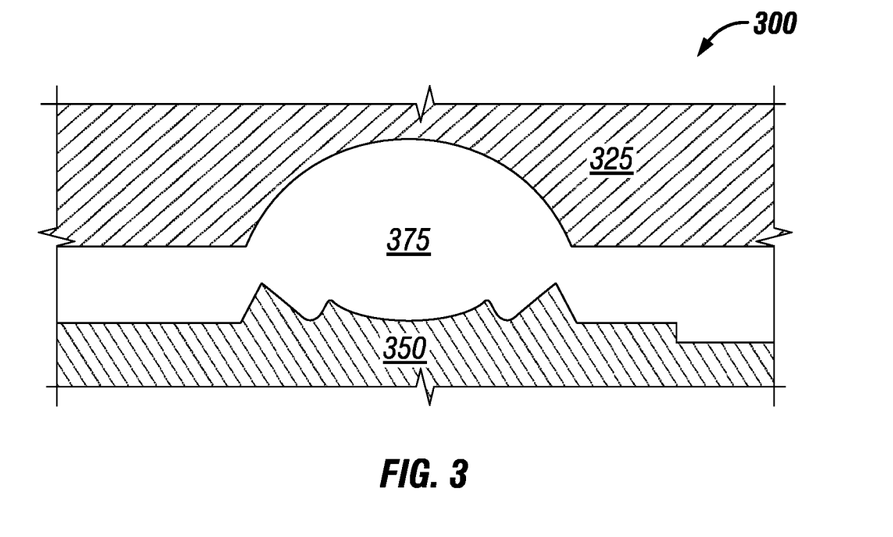
FIG. 3 illustrates a cross sectional view of a mold for fabricating the optic illustrated in FIG. 1 according to some example embodiments of the present disclosure.
Figure 4:
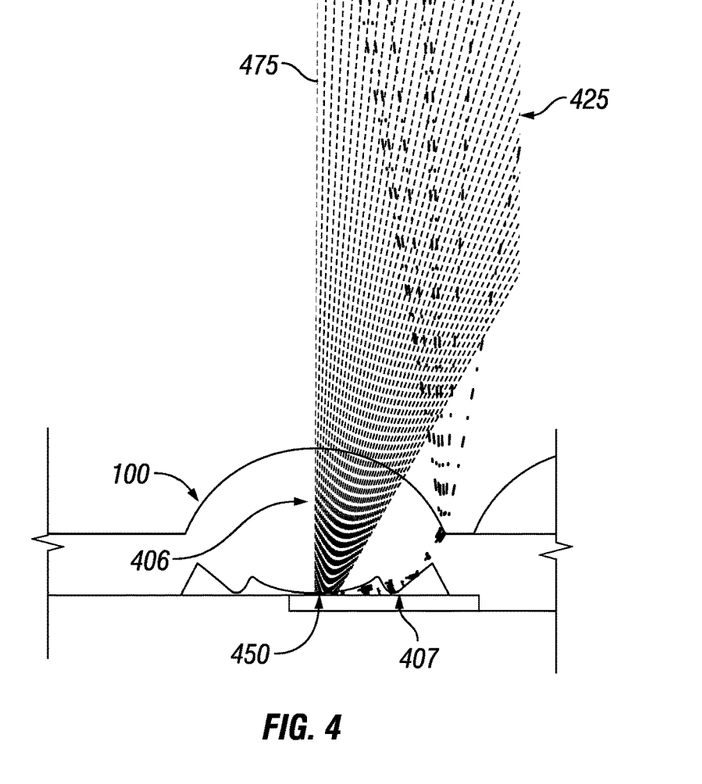
FIG. 4 illustrates a cross sectional view of the optic of FIG. 1 overlaid with ray traces according to some example embodiments of the present disclosure.
Figure 5:
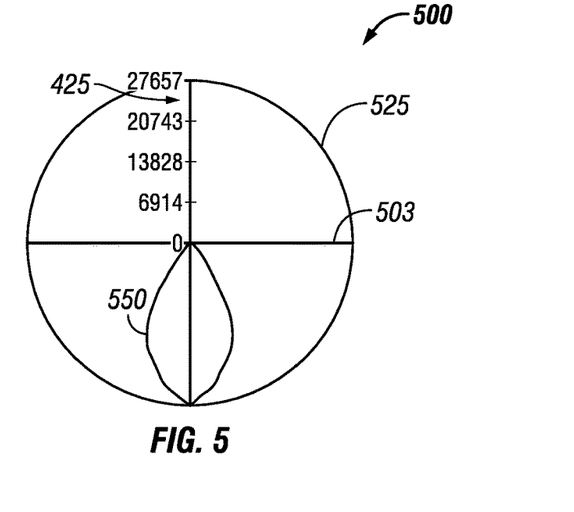
FIG. 5 illustrates a polar plot of illumination output for the optic of FIG. 1 according to some example embodiments of the present disclosure.

Turning now to FIGS. 1, 2, 3, 4, and 5, an example optic 100 for managing light emitted by a light emitting diode 450 is illustrated in accordance with some embodiments of the present disclosure. FIG. 1 is an illustration of an example cross sectional view of the optic 100 in accordance with some embodiments of the present disclosure. FIGS. 2A and 2B respectively are illustrations of front and backsides 225, 250 of an example optical array 200 formed from an array of the optics 100 illustrated in FIG. 1 in accordance with some embodiments of the present disclosure. FIG. 3 is an illustration of a cross sectional view of an example mold 300 for fabricating the optic 100 illustrated in FIG. 1 in accordance with some embodiments of the present disclosure. FIG. 4 is an illustration of a cross sectional view of the optic 100 of FIG. 1 overlaid with example ray traces 425 in accordance with some embodiments of the present disclosure. FIG. 5 is an illustration of an example polar plot 500 of illumination output for the optic 100 of FIG. 1 in accordance with some embodiments of the present disclosure.

As best seen in FIGS. 1 and 4, the optic 100 comprises a backside 150 that receives light from the light emitting diode 450 and a front side 125 that emits the received light. In the illustrated embodiment, the front side 125 comprises a convex region 110, which may be spherical, aspherical, or some other appropriate form. As illustrated, the convex region 110 is rotationally symmetrical about an optical axis 475 of the light emitting diode 450.

In the illustrated example, the backside 150 of the optic 100 comprises a convex central region 140 disposed adjacent the light emitting diode 450. The light emitting diode 450 is centered in the convex central region 140 in this example. The convex central region 140 is rotationally symmetrical about an optical axis 475 of the light emitting diode 450.

A groove 135 extends peripherally about or circumscribes the convex central region 140. Another groove 125 extends peripherally about or circumscribes the groove 135 and the convex central region 140. As illustrated, the groove 125, the groove 135, and the convex central region 140 are concentric. However, other embodiments may incorporate nonconcentric grooves. As illustrated, the groove 125 is deeper than the groove 135. In other embodiments, the groove 125 and the groove 135 may have substantially similar depths, or the groove 135 may be deeper than the groove 125.

In the illustrated embodiment, an outer portion 131 of the groove 135 and an inner portion 132 of the groove 125 form a protrusion 130. The protrusion 130 extends peripherally about or circumscribes the groove 135 and the convex central region 140. The illustrated backside 150 of the optic 100 further comprises a flat area 106 and a recessed area 115 that facilitates mechanical mounting or positioning.

As can be seen in the example ray traces 425 illustrated by FIG. 4, the light emitting diode 450 emits light across a range of angles extending from the optical axis 475 towards perpendicular to the optical axis 475. A central portion 406 of the light rays 425 are incident upon and are refracted by the convex central region 140 of the optic 100, which condenses the resulting output beam.

Another portion of the light rays 425 comprises peripheral light 407 that propagates in the opening behind the optic 100 provided by the groove 135. Thus, peripheral light 407 propagates radially across the groove 135 through open space along the backside 150 of the optic 100. That peripheral light 407 is incident upon the surface 131 of the protrusion 130, where the illustrated surface 131 is also a side surface of the groove 135. The peripheral light 407 enters the optic 100 through the surface 131 and is internally reflected by the surface 132 of the protrusion 130, where the illustrated surface 132 is also a surface of the groove 125. The internal reflection, which may comprise total internal reflection or internal reflection resulting from metallization, directs the peripheral light 407 forward for incidence upon the convex region 110 of the front side 125 of the optic.

Referring now to FIG. 3, the optic 100 can be fabricated via injection molding using the illustrated mold 300. The mold 300 comprises a front mold member 325 and a backside mold member 350 that can be clamped together during molding operation and that may be characterized as tooling inserts. When the front mold member 325 and the backside mold member 350 are so arranged, they form a cavity 375 into which molten optical polymer is injected, thus forming the optic 100. When the molten optical polymer cools, the members 325, 350 are separated to release the solidified optic 100 for removal. The polymer can comprise polycarbonate, acrylic, or another appropriate optical material, for example.

Rather than limited to producing individual optical elements, the mold 300 can comprise an array of optical features (one of which is shown in FIG. 3 in a detail view) for producing the optical array 200 illustrated in FIG. 2. FIG. 2A illustrates the front side 225, while FIG. 2B illustrates the backside 250 of the optical array 200. Each of the individual optics 100 in the optical array 200 can be aligned to a different light emitting diode 450 to provide an array of light sources, for example.

Referring now to FIGS. 4 and 5, an example illumination pattern for the optic 100 and the associated light emitting diode 450 will be described in further detail. As discussed above, the optic 100 condenses the light produced by the light emitting diode 450 to create a beam that is narrower or diverges less than the light emitting directly from the raw light emitting diode 450. Thus, in the embodiment of FIGS. 1-5, the optic 100 concentrates the light emitted by the light emitting diode 450 to achieve a relatively narrow distribution.

FIG. 5 illustrates an example polar plot 500 of the resulting concentrated illumination. The polar plot 500 includes a trace 525 and another trace 550 that were generated using computer modeling rather than by laboratory testing. The trace 550 describes the intensity of the light output by the optic 100 as a function of angular deviation from the optical axis 475. Thus, if the optic 100 is positioned so that the optical axis 475 is vertical and perpendicular to a line 503 representing horizontal, the trace 550 describes illumination intensity across a range of angles that extends between the optical axis 475 and line 503.

Meanwhile, the trace 525 describes intensity of azimuthal light distribution of the optic 100 or light distribution intensity circumferentially around the optical axis 475. Thus, the trace 525 characterizes a birds-eye view of the illumination pattern and shows that the optic 100 and the light emitting diode 450 produce a rotationally symmetrical light distribution.

The data underlying the trace 550 show a beam angle of approximately 60 degrees and a field angle of approximately 80 degrees (which are example values among a wide range of others supported by embodiments of the disclosure). Accordingly, the optic 100 is well suited for some overhead mounting applications at mounting heights above 40 feet (among heights and other applications).

Figure 6:
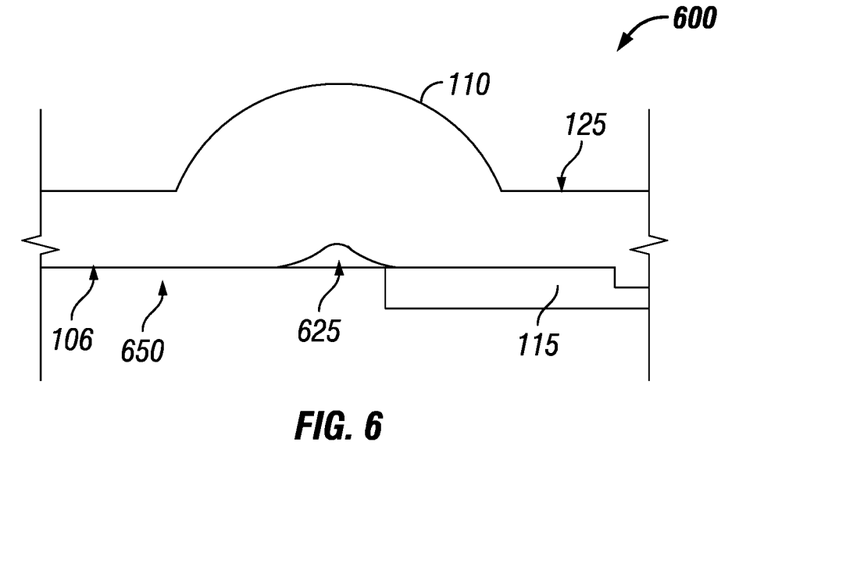
FIG. 6 illustrates a cross sectional view of another optic for managing light emitted by a light emitting diode according to some example embodiments of the present disclosure.
Figure 7A:
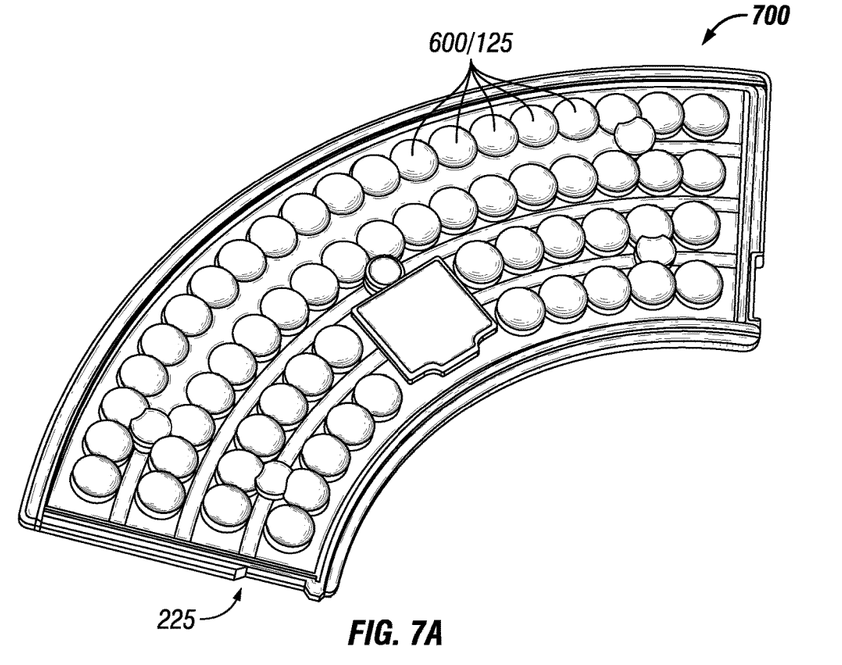
FIGS. 7A and 7B (collectively FIG. 7) illustrate front and backsides of an array of the optics illustrated in FIG. 6 according to some example embodiments of the present disclosure.
Figure 7B:
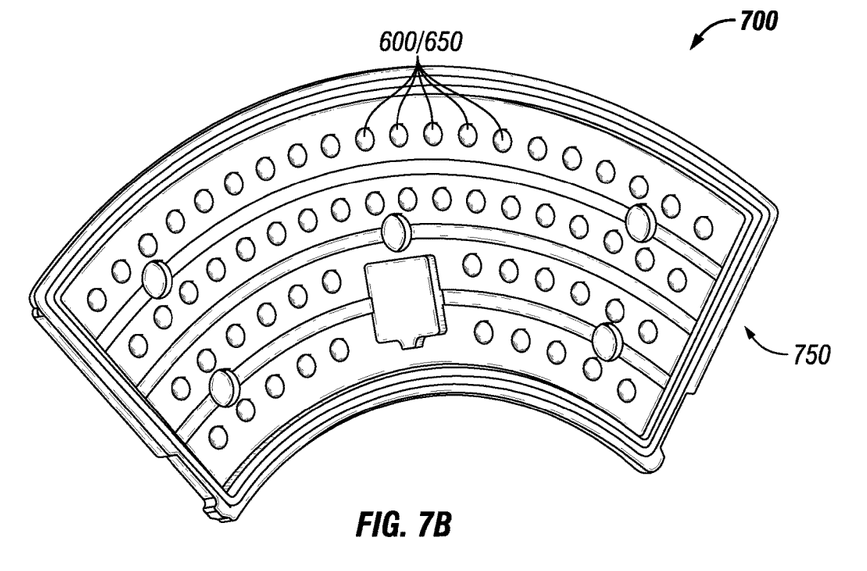
Figure 8:
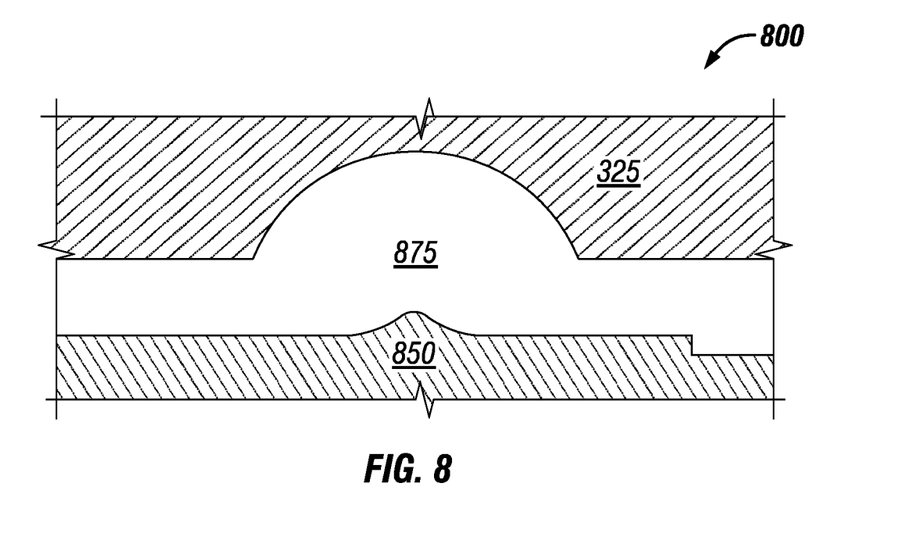
FIG. 8 illustrates a cross sectional view of a mold for fabricating the optic illustrated in FIG. 6 according to some example embodiments of the present disclosure.
Figure 9:
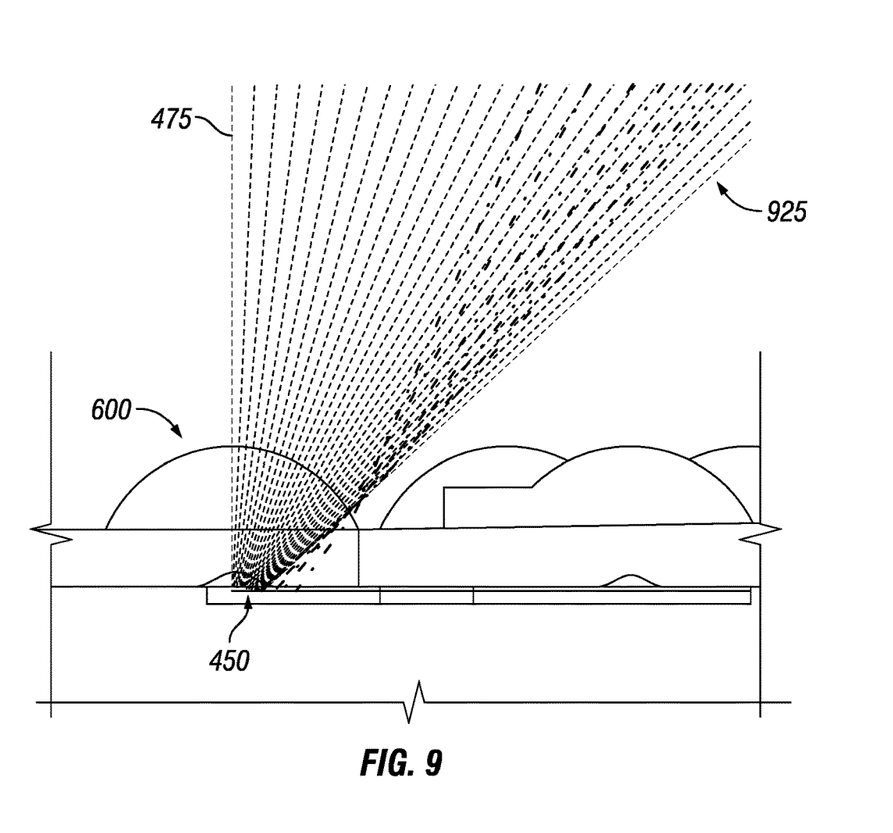
FIG. 9 illustrates a cross sectional view of the optic of FIG. 6 overlaid with ray traces according to some example embodiments of the present disclosure.
Figure 10:
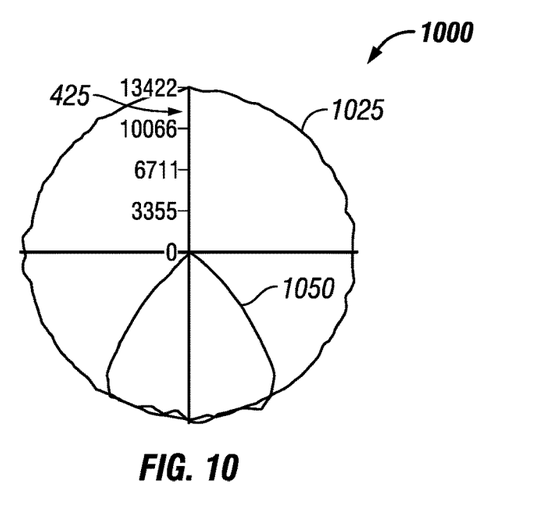
FIG. 10 illustrates a polar plot of illumination output for the optic of FIG. 6 according to some example embodiments of the present disclosure.

Turning now to FIGS. 6, 7, 8, 9, and 10, an example optic 600 for managing light emitted by a light emitting diode 450 is illustrated in accordance with some embodiments of the present disclosure. FIG. 6 is an illustration of an example cross sectional view of the optic 600 in accordance with some embodiments of the present disclosure. FIGS. 7A and 7B respectively are illustrations of front and backsides 225, 750 of an example optical array 700 formed from an array of the optic 600 illustrated in FIG. 6 in accordance with some embodiments of the present disclosure. FIG. 8 is an illustration of a cross sectional view of an example mold 800 for fabricating the optic 600 illustrated in FIG. 6 in accordance with some embodiments of the present disclosure. FIG. 9 is an illustration of a cross sectional view of the optic 600 of FIG. 6 overlaid with example ray traces 925 in accordance with some embodiments of the present disclosure. FIG. 10 is an illustration of an example polar plot 1000 of illumination output for the optic 600 of FIG. 6 in accordance with some embodiments of the present disclosure.

As shown in FIGS. 6 and 9, the optic 600 comprises a backside 650 that receives light from the light emitting diode 450 and a front side 125 that emits the received light. In the illustrated embodiment, the front side 125 comprises a convex region 110, which may be spherical, aspherical, or some other appropriate form. As illustrated, the convex region 110 is rotationally symmetrical about the optical axis 475 of the light emitting diode 450. In the illustrated embodiment, the front side 125 of the optic 600 has the same form as the front side 125 of the optic 100 that is illustrated in FIG. 1 and discussed above.

In the illustrated example, the backside 150 of the optic 100 comprises a concave central region 625 disposed adjacent the light emitting diode 450. In the illustrated example embodiment, the concave central region 625 comprises a flared periphery. The light emitting diode 450 can be centered upon the concave central region 625 for example. The illustrated backside 650 of the optic 600 further comprises a flat area 106 and a recessed area 115 that facilitates mechanical mounting or positioning.

As can be seen in the example ray traces 925 illustrated by FIG. 9, the light emitting diode 450 emits light across a range of angles extending from the optical axis 475 towards perpendicular to the optical axis 475. The concave central region 625 receives and refracts the emitted light. Thus, light enters the optic 600 through the concave central region 625. The light then exits the optic 600 through the convex region 110 of the front side 125 of the optic 600. As will be discussed in further detail below with reference to FIGS. 9 and 10, the optic 600 produces an illumination pattern that is less concentrated and thus is more divergent than the optic 100.

Referring now to FIG. 8, the optic 600 can be fabricated via injection molding using the illustrated mold 800. The mold 800 comprises the front mold member 325 and a backside mold member 850 that can be clamped together during molding operation, and that may be characterized as tooling inserts, as discussed above with reference to FIG. 3. When the front mold member 325 and the backside mold member 850 are so arranged (for example as illustrated in FIG. 8), they form a cavity 875 into which molten optical polymer is injected to form the optic 600. When the molten optical polymer cools, the members 325, 850 are separated for removal of the solidified optic 600.

Since the mold 800 utilizes the same front mold member 325 as used by the mold 300, three mold members (the mold member 325, the mold member 350, and the mold member 850) can be utilized to make two different types of optics. In other words, the mold member 325 can be paired with the mold member 350 or the mold member 850. Using the same mold member with two different molds reduces tooling costs relative to having dedicated mold members.

In some example embodiments, the mold 800 can comprise an array of optical features for producing the optical array 700 illustrated in FIG. 7. FIG. 7A illustrates the front side 225, while FIG. 2B illustrates the backside 750 of the optical array 700. Each of the individual optics 600 in the optical array 700 can be aligned to a different light emitting diode 450 to provide an array of light sources, as discussed above, for example.

Referring now to FIGS. 9 and 10, an example illumination pattern for the optic 600 and the associated light emitting diode 450 will be further described. As discussed above, the optic 600 manages the light produced by the light emitting diode 450 to create a beam of controlled divergence. As shown by the geometry of the light rays 925 illustrated in FIG. 9, as compared to the light rays 425 illustrated in FIG. 4, the optic 600 spreads light more broadly than the optic 100.

FIG. 10 illustrates an example polar plot 1000 of the resulting illumination pattern. The polar plot 1000 includes a trace 1025 and another trace 1050 that were generated using computer modeling. In keeping with the traces 525, 550 of the plot 500, the trace 1050 describes light intensity according to angular deviation from the optical axis 475. Thus, if the optic 600 were mounted overhead to emit light vertically downward, the trace 1050 would characterize intensity at angles between straight downward and horizontal. Accordingly, a comparison between the trace 500 and the trace 1050 shows that the optic 600 outputs a more divergent illumination pattern than the optic 100. Meanwhile, the trace 1025 shows that light distribution produced by the optic 600 is rotationally symmetrical about the optical axis 475, which is consistent with the rotational symmetry of the optic 100 discussed above.

The data underlying the trace 550 show a beam angle of approximately 85 degrees and a field angle of approximately 105 degrees (which are example values among a wide range of others supported by embodiments of the disclosure). Accordingly, the optic 600 is well suited for overhead mounting at lower mounting heights than the optic 100. For example, the optic 600 may be utilized for outdoor illumination at a mounting height of 20, 30, or 40 feet (for some overhead mounting applications, among other heights and applications).

Figure 11:
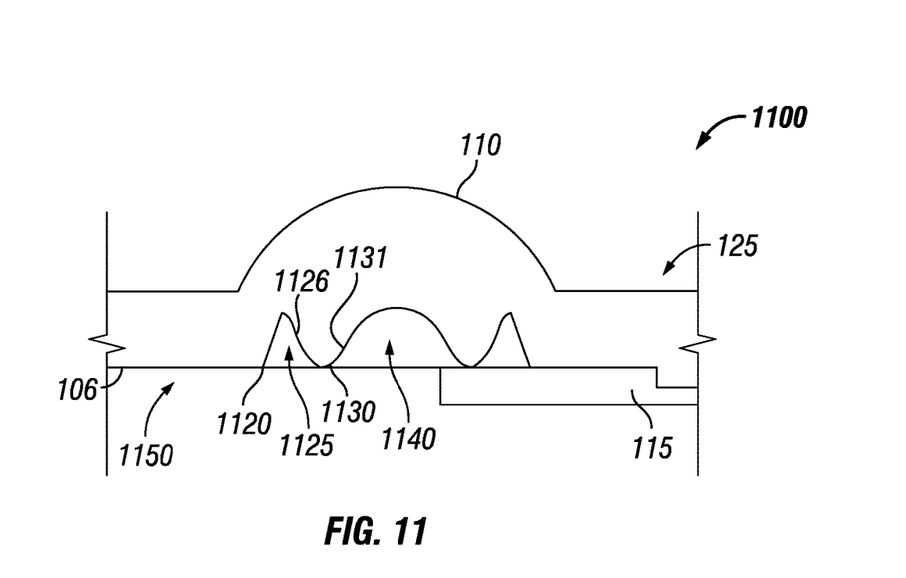
FIG. 11 illustrates a cross sectional view of another optic for managing light emitted by a light emitting diode according to some example embodiments of the present disclosure.
Figure 12A:
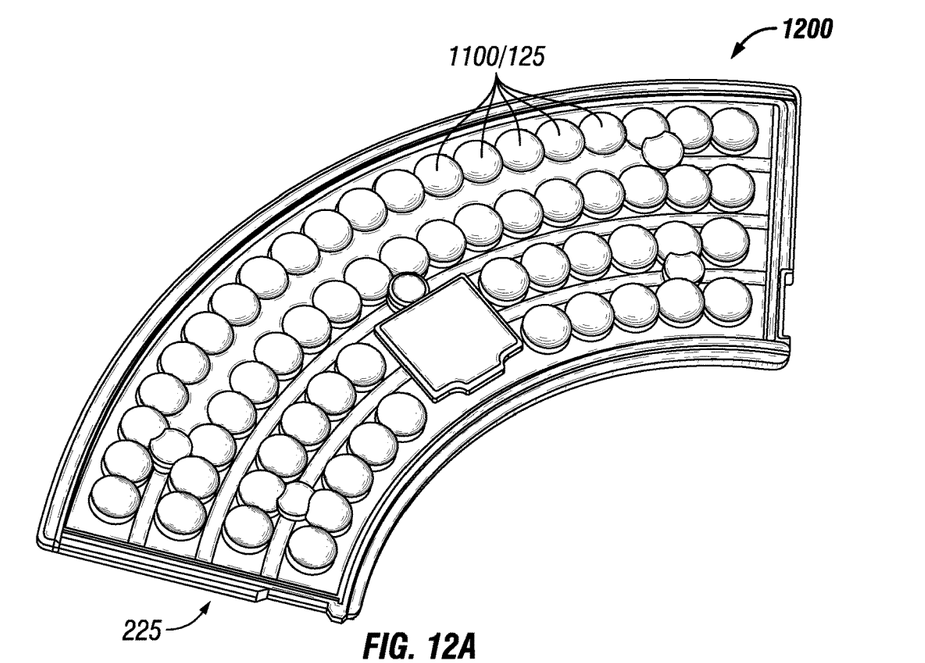
FIGS. 12A and 12B (collectively FIG. 12) illustrate front and backsides of an array of the optics illustrated in FIG. 11 according to some example embodiments of the present disclosure.
Figure 12B:
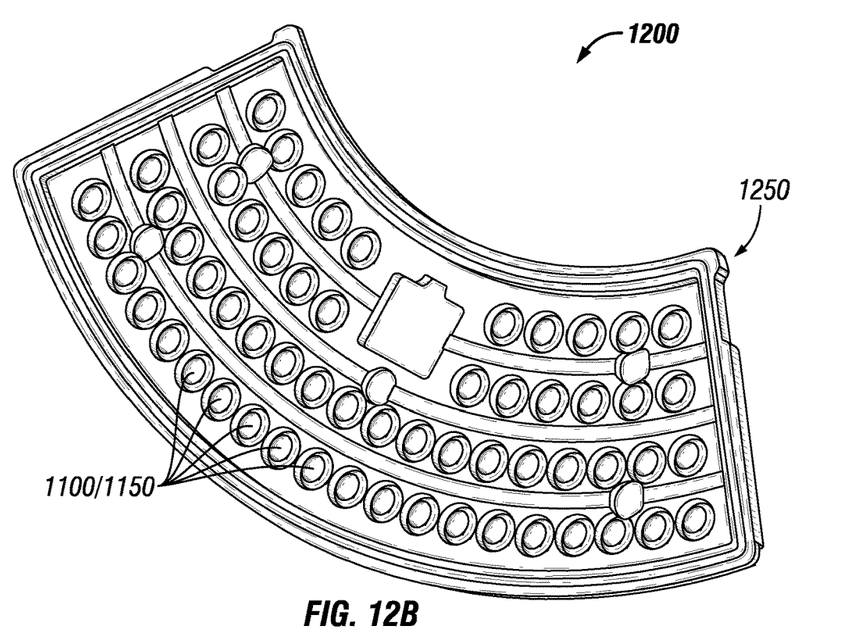
Figure 13:
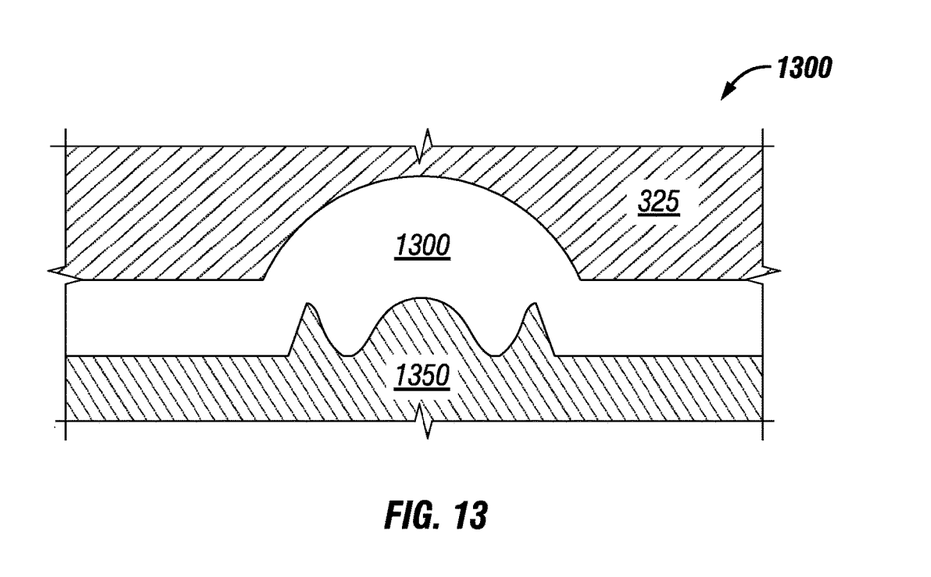
FIG. 13 illustrates a cross sectional view of a mold for fabricating the optic illustrated in FIG. 11 according to some example embodiments of the present disclosure.
Figure 14:
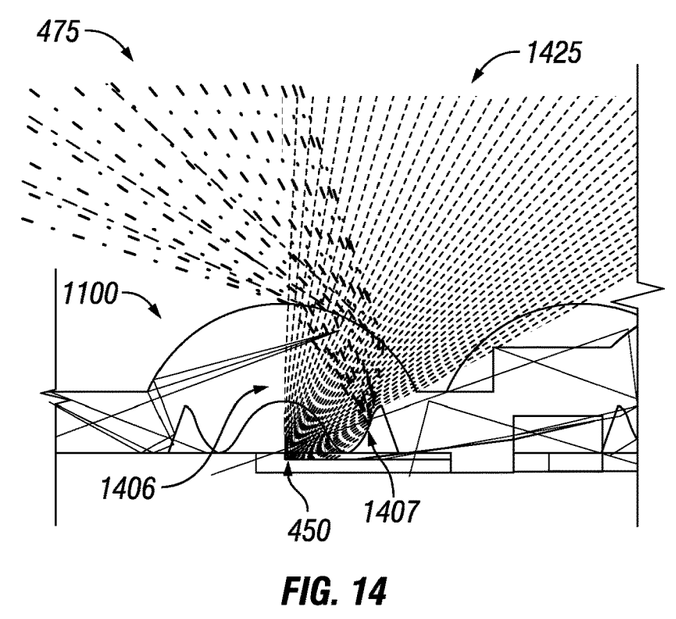
FIG. 14 illustrates a cross sectional view of the optic of FIG. 11 overlaid with ray traces according to some example embodiments of the present disclosure.
Figure 15:
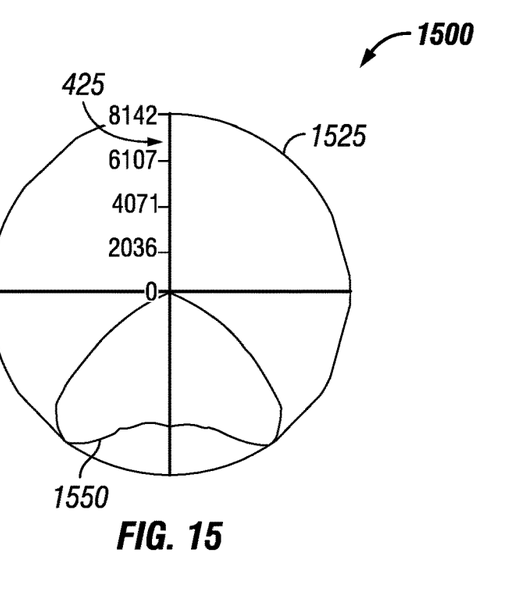
FIG. 15 illustrates a polar plot of illumination output for the optic of FIG. 11 according to some example embodiments of the present disclosure.

Turning now to FIGS. 11, 12, 13, 14, and 15, an example optic 1100 for managing light emitted by a light emitting diode 450 is illustrated in accordance with some embodiments of the present disclosure. FIG. 11 is an illustration of an example cross sectional view of the optic 1100 in accordance with some embodiments of the present disclosure. FIGS. 12A and 12B respectively are illustrations of front and backsides 225, 1250 of an example optical array 1200 formed from an array of the optic 1100 illustrated in FIG. 11 in accordance with some embodiments of the present disclosure. FIG. 13 is an illustration of a cross sectional view of an example mold 1300 for fabricating the optic 1100 illustrated in FIG. 11 in accordance with some embodiments of the present disclosure. FIG. 14 is an illustration of a cross sectional view of the optic 1100 of FIG. 11 overlaid with example ray traces 1425 in accordance with some embodiments of the present disclosure. FIG. 15 is an illustration of an example polar plot 1500 of illumination output for the optic 1100 of FIG. 11 in accordance with some embodiments of the present disclosure.

As best seen in FIGS. 11 and 14, the optic 1100 comprises a backside 1150 positioned to receive light from the light emitting diode 450 and a front side 125 that emits the received light. In the illustrated example embodiment, the front side 125 has the same form as the optic 100, has the same form as the optic 1100, and comprises a convex region 110, as discussed above. As illustrated, the convex region 110 is rotationally symmetrical about an optical axis 475 of the light emitting diode 450.

In the illustrated example, the backside 1150 of the optic 1100 comprises a concave central region 1140 disposed adjacent the light emitting diode 450 to receive light. In the illustrated example embodiment, the light emitting diode 450 is centered in the concave central region 1140 in this example.

A groove 1125 extends peripherally about or circumscribes the concave central region 1140. As illustrated, the groove 1125 and the concave central region 1140 are concentric or coaxial and are aligned to the convex region 110. However, other embodiments may incorporate one or more nonconcentric grooves. As illustrated, the concave central region 1140 is deeper than the groove 1125. In some embodiments, the groove 1125 may be deeper than the concave central region 1140. In some embodiments, the groove 1125 has a depth in a range of plus or minus approximately 35 percent of the depth of the concave central region 1140.

In the illustrated embodiment, an outer portion 1131 of the concave central region 1140 and an inner portion 1126 of the groove 1125 form a protrusion 1130. The protrusion 1130 extends peripherally about or circumscribes the concave central region 1140, and the protrusion 1130 is disposed radially between the groove 1125 and the concave central region 1140. The illustrated backside 1150 of the optic 1100 further comprises a flat area 106 and a recessed area 115 that facilitates mechanical mounting or positioning.

As can be seen in the example ray traces 1425 illustrated by FIG. 14, the light emitting diode 450 emits light across a range of angles extending from the optical axis 475 to perpendicular to the optical axis 475. A central portion 1406 of the light rays 1425 are incident upon and are refracted by the surface of the concave central region 1140 of the optic 1100 for subsequence incidence upon the internal surface of the convex region 110 of the front side 125 of the optic 1100. Thus, the concave central region 1140 refracts a portion of incident light into the convex region 110 at the front side 125 of the optic 1100.

Another portion of the light rays 1425 comprises peripheral light 1407 that transmits through the outer portion 1131 of the concave central region 114 and is incident upon the inner portion 1126 of the groove 1125. The inner portion 1126 of the groove 1125 internally reflects those light rays 1407 into the convex region 110 on the front side of the optic 1100, for transmission out of the optic 1100. In other words, the light rays 1407 transmit through the inner surface of the protrusion 1130 and are reflected by the outer surface of the protrusion 1130 towards the convex region 110. The reflection is typically total internal reflection, but may alternatively be via metallization or other treatment.

Referring now to FIG. 13, the optic 1100 can be fabricated via injection molding using the illustrated mold 1300. The mold 1300 comprises a front mold member 325 and a backside mold member 1350 that can be clamped together during molding operation and that may be characterized as tooling inserts. When the front mold member 325 and the backside mold member 1350 are so arranged, they form a cavity 1375 into which molten optical polymer is injected to form the optic 1100. As discussed above, the backside mold member 1350 in combination with the front mold member 325, the backside mold member 350, and the backside mold member 850 form a mold tooling system that can produce three type of optics having three different backside forms.

Rather than limited to producing individual optical elements, the mold 1300 can comprise an array of optical features for producing the optical array 1200 illustrated in FIG. 12. FIG. 12A illustrates the front side 225, while FIG. 2B illustrates the backside 1250 of the optical array 1200. Each of the individual optics 1100 in the optical array 1200 can be aligned to a different light emitting diode 450 to provide an array of light sources, for example.

Referring now to FIGS. 14 and 15, an example illumination pattern for the optic 1100 and the associated light emitting diode 450 will be described in further detail. As discussed above, the optic 1100 incorporates a combination of concave refractive features, convex refractive features, and internally reflective features to manipulate the light produced by the light emitting diode 450 and produce a beam with controlled divergence. In the embodiment of FIGS. 11-15, the optic 1100 spreads the light emitted by the light emitting diode 450 to achieve a relatively broad distribution that is wider and more divergence than the illumination produced by the optic 100 or the optic 600.

FIG. 15 illustrates an example polar plot 1500 of the resulting illumination. The polar plot 1500 includes a trace 1525 and another trace 1550 that were generated using computer modeling. The trace 1550 describes the intensity of the light output by the optic 1100 as a function of angular deviation from the optical axis 475, while the trace 1525 describes intensity of azimuthal light distribution of the optic 1100 or light distribution intensity circumferentially around the optical axis 475.

The data underlying the trace 1550 show a beam angle of approximately 110 degrees and a field angle of approximately 140 degrees (which are example values among a wide range of others supported by embodiments of the disclosure). Accordingly, the optic 1100 is well suited for overhead mounting at lower mounting heights than the optic 100 or the optic 600. For example, the optic 1100 may be utilized for some outdoor illumination applications at a mounting height of 20 or 25 feet (among other heights and applications).

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. An optic comprising:
    a backside positioned to receive light from a light emitting diode; and
    a front side that is opposite the backside and that comprises a convex region,
    wherein the backside comprises:
        a concave region; and
        a groove circumscribing the concave region, and
    wherein the convex region of the front side is disposed to receive and refract light internally reflected from a surface of the groove.

2. The optic of claim 1, wherein the optic comprises a protrusion that circumscribes the concave region and that is formed between the groove and the concave region.

3. The optic of claim 2, wherein the concave region comprises a second surface extending peripherally with respect to the concave region, and
    wherein the protrusion comprises:
        the surface; and
        the second surface.

4. The optic of claim 3, wherein the surface is totally internally reflective.

5. The optic of claim 3, wherein the surface is internally reflective.

6. The optic of claim 1, wherein the concave region has a first depth,
    wherein the groove has a second depth, and
    wherein the first depth is within approximately thirty-five percent of the second depth.

7. A lighting system comprising:
    a light emitting diode; and
    an optic comprising:
        a backside positioned to receive light from the light emitting diode; and
        a front side that is opposite the backside and that comprises a convex region,
    wherein the backside comprises:
        a concave region disposed adjacent the light emitting diode; and
        a groove circumscribing the concave region, and
    wherein the convex region of the front side is disposed to receive and refract light that is emitted by the light emitting diode and internally reflected from a surface of the groove.

8. The lighting system of claim 7, wherein the backside of the optic further comprises a flat surface that extends peripherally with respect to the groove.

9. The lighting system of claim 7, wherein the optic comprises a protrusion that circumscribes the concave region and that is formed between the groove and the concave region.

10. The lighting system of claim 9, wherein the concave region comprises a second surface extending peripherally with respect to the concave region, and
    wherein the protrusion comprises:
        the surface; and
        the second surface.

11. The lighting system of claim 10, wherein the surface is totally internally reflective with respect to the light that is produced by the light emitting diode and that enters the optic through the second surface.

12. The lighting system of claim 10, wherein the surface is internally reflective.

13. The lighting system of claim 7, wherein the light emitting diode comprises an array of light emitting diodes that the lighting system comprises, and wherein the optic comprises an optical array aligned to the array of light emitting diodes.

14. The lighting system of claim 7, wherein the concave region has a first depth, wherein the groove has a second depth, and wherein the first depth is within approximately thirty-five percent of the second depth.

15. A system for fabricating optics, the system comprising:

a first member;

a second member; and a third member, wherein the first member and the second member comprise a first injection mold for molding a first type of optic, wherein the first member and the third member comprise a second injection mold for molding a second type of optic, wherein the first type of optic and the second type of optic have a common front side formed by the first member, and wherein the first type of optic and the second type of optic have different backside forms, that are formed by the second member and the third member, for providing two different light distributions, and wherein the second member forms the first type of optic such that it comprises:

a first backside, the first backside comprising:

a concave region;

a groove circumscribing the concave region; and a protrusion that circumscribes the concave region and that is formed between the groove and the concave region.

16. The system of claim 15, wherein the protrusion comprises a first surface defining a portion of the concave region and a second surface defining a portion of the groove.

17. The system of claim 16, wherein the second surface of the protrusion is operative to internally reflect a peripheral light from a light emitting diode when the peripheral light enters the optic through the first surface of the protrusion.

* * * * *